(12) United States Patent
Mocanu

(10) Patent No.: US 8,413,046 B1
(45) Date of Patent: Apr. 2, 2013

(54) SYSTEM AND METHOD FOR OPTIMIZING RICH WEB APPLICATIONS

(75) Inventor: Sorin Alexandru Mocanu, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/272,159

(22) Filed: Oct. 12, 2011

(51) Int. Cl.
*G06F 17/00* (2006.01)
(52) U.S. Cl. .................. 715/234; 715/200; 715/273
(58) Field of Classification Search .................. 715/234, 715/273, 200
See application file for complete search history.

(56) References Cited

U.S. PATENT DOCUMENTS

| | | | |
|---|---|---|---|
| 7,877,702 B2 | 1/2011 | Mahasintunan | |
| 2011/0066676 A1 | 3/2011 | Kleyzit et al. | |
| 2011/0302524 A1* | 12/2011 | Forstall | 715/781 |

OTHER PUBLICATIONS

Hyatt, "WebCore Rendering", Parts I-V, 18 pages provided (Aug. 2007), retrieved from http://www.webkit.org/projects/layout/index.html.*

StackOverflow, "How can I make the browser wait to display the page until its fully loaded?", 6 pages provided (Sep. 2009), retrieved from http://stackoverflow.com/questions/1435015/how-can-i-make-the-browser-wait-to-display-the-page-until-its-fully-loaded.*

"The WebKit Open Source Project—Layout and Rendering," retrieved Jan. 26, 2012 from http://www.webkit.org/projects/layout/index.html.*

".ready( ) jQuery API", retrieved Jan. 26, 2012 from http://api.jquery.com/ready/.*

L. David Baron, "Mozilla's Layout Engine," 11 pages (Dec. 2006), retrieved from http://www-archive.mozilla.org/newlayout/doc/layout-2006-12-14/master.xhtml.*

* cited by examiner

*Primary Examiner* — Doug Hutton, Jr.
*Assistant Examiner* — Scott M Kelly
(74) *Attorney, Agent, or Firm* — McDermott Will & Emery LLP

(57) ABSTRACT

A system and machine-implemented method for optimizing the displaying of a rich web user interface (UI) to a user, the method including rendering a hidden base node and one or more child nodes within a Dynamic Object Model (DOM) tree structure determining if one or more nodes of the one or more child nodes and the base node represent a useful portion of the rich web UI based on whether the one or more nodes meet a pre-defined set of criteria, and exposing the base node if the one or more nodes represent a useful portion of the rich web UI, causing rendering of the useful portion of the rich web UI by displaying display elements corresponding to each of the base node and the one or more child nodes.

16 Claims, 5 Drawing Sheets

SYSTEM AND METHOD FOR OPTIMIZING RICH WEB APPLICATIONS

BACKGROUND

The subject disclosure generally relates to increasing performance of websites and web applications, and, in particular, decreasing web page load time.

When a web browser navigates to a web page, it first requests and fetches the base page using HTTP protocol. After receiving the base page from the server, the web browser parses it, and renders or generates its Document Object Model (DOM). After the initial rendering, the web browser can send additional requests, react to user input or other external inputs and trigger rendering additional elements of the DOM or re-rendering (updating) some of the existing DOM elements.

The browser may then display the web document (i.e. a webpage) to a user by referencing the DOM and rendering the DOM tree elements. As the DOM tree is updated, the browser detects the updated DOM elements and re-renders all or part of the web document according to the updated DOM tree until all elements of the DOM tree are rendered.

Reflow is the web browser process for re-calculating the positions and geometries of elements in the document, for the purpose of re-rendering all or part of the document. Sometimes reflowing a single element in the document may require reflowing its parent elements and also any elements which follow it. For example, changes at one level in the DOM tree can cause changes at every level of the tree—all the way up to the root, and all the way down into the children of the modified node. This leads to more time being spent performing reflow.

Because reflow is a user-blocking operation in the browser, it may be desirable to reduce reflow time to improve the time to render a web document displayed to the user.

SUMMARY

The disclosed subject matter relates to a machine-implemented method for optimizing the displaying of a rich web user interface (UI) to a user, comprising rendering a hidden base node within a Dynamic Object Model (DOM) tree structure corresponding to at least a portion of a rich web UI. The method further comprising rendering at least one child node below the base node within the DOM tree structure. The method further comprising determining if the at least one child node and the base node represent a useful portion of the rich web UI and exposing the base node if the at least one child node and the base node represent a useful portion of the rich web UI. The changing the hidden property of the base node may comprise enforcing a visible display mode, such that the browser begins rendering the portion of the rich web UI represented by the base node and the at least one child node for display to a user.

The subject disclosure also relates to a system for optimizing the displaying of a rich web UI to a user, the system comprising one or more processors and a machine-readable medium comprising instructions stored therein, which when executed by the processors, cause the processors to perform operations comprising rendering a base node within a Dynamic Object Model (DOM) tree structure corresponding to at least a portion of a rich web UI. The operations further comprising assigning a style property to the base node such that the base node is invisible, and wherein the base node and any child nodes of the base node are not visually rendered for display while the base node is invisible. The operations further comprising rendering one or more child nodes below the base node within the DOM tree structure. The operations further comprising determining if the one or more child nodes and the base node represent a useful portion of the rich web UI and exposing the base node if the one or more child nodes and the base node represent a useful portion of the rich web UI.

The subject disclosure further relates to a machine-readable medium comprising instructions stored therein, which when executed by a machine, cause the machine to perform operations comprising rendering a base node within a Dynamic Object Model (DOM) tree structure corresponding to at least a portion of a rich web UI. The operations further comprising assigning a hidden property to the base node. The operations further comprising rendering one or more child nodes below the base node within the DOM tree structure. The operations further comprising determining if the at least one child node and the base node represent a useful portion of the rich web UI and exposing the base node if the one or more child nodes and the base node represent a useful portion of the rich web UI, wherein exposing the base node causes rendering the useful portion of the rich web UI by displaying display elements corresponding to each of the base node and the at least one child node.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
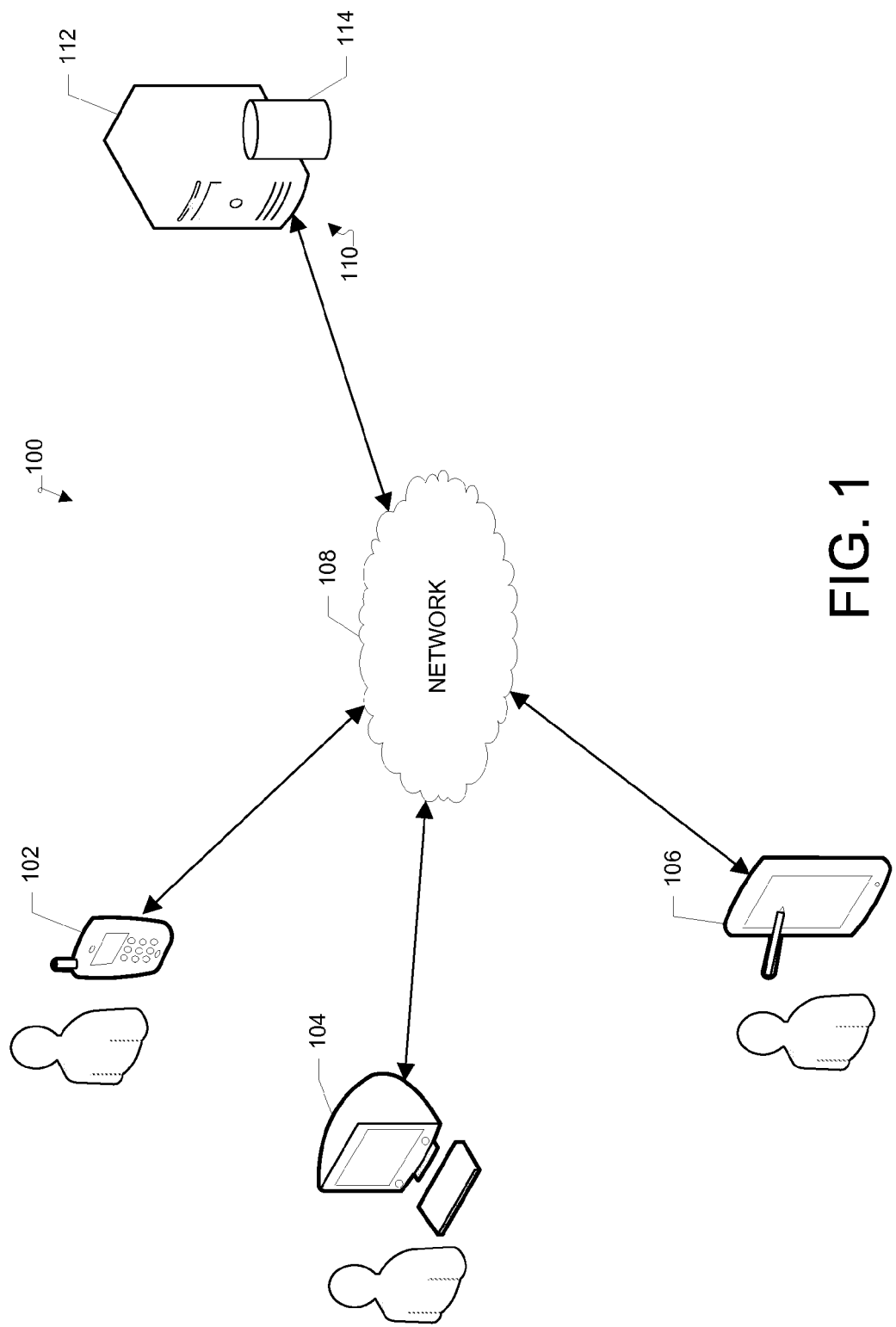
FIG. 1 illustrates an example client-server network environment which provides for group conversation.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A webpage also referred to as a web document, consists of a base markup page, hereinafter referred to as the base page (e.g., an HTML page), and multiple supporting web resources or objects. Resources can be different types, such as scripts (e.g. JavaScript), data resources (e.g. XML or other text-based data), style sheets, images and other page components. There are many image formats such as GIF, PNG, and JPEG. The purpose of a web browser is to read HTML documents and compose them into visible or audible web pages.

When a web browser navigates to a web page (either on initial start up or upon refresh or change of a page), it may issue a request and send a request to the host server. The host server then forwards a response (e.g., an HTTP response) back to the browser including the base page. Upon receiving the response, the browser parses the response including the base page (e.g., an HTML base page) and begins to render a Document Object Model (DOM) tree out of the base page. While parsing the base page, the web browser may discover additional resources and may individually request the additional resources. When working with Rich Internet Applications, the browser may update the page by sending additional requests (e.g., AJAX requests) that cause rendering additional elements of the DOM or re-rendering (updating) some of the existing DOM elements. The web browser receives the response (e.g., AJAX response), and parses and injects the markup data (e.g., HTML, XML or JSON) into the existing DOM. For example, upon an initial load or page flip the application receives the additional elements and injects the additional elements into the DOM.

The browser may render a web document (e.g., rich web User Interface (UI)) for display to a user by incrementally referencing the DOM tree structure and rendering the DOM tree elements (e.g., upon detecting that the application has updated the DOM tree). In this instance, as the DOM tree is updated in response to browser making requests (e.g., the initial load request or additional AJAX requests), reacting to user input (e.g., inputs by the user with respect to the web UI using one or more user input means) or other external inputs and triggers (e.g., where the web document is a monitoring interface with input signals being generated from one or more other devices or other signals generated by an external device, such as a system clock), the browser detects the updated DOM elements and re-renders all or part of the rich web UI according to the updated DOM tree until the entire DOM tree is rendered. Since the DOM tree is updated while the browser is rendering the rich web UI for display to the user, the process may involve reflow. Reflow refers to the process for re-calculating the positions and geometries of elements in the document, for the purpose of re-rendering all or part of the document. Sometimes reflowing a single element in the document may require reflowing its parent elements and also any elements which follow it. For example, changes at one level in the DOM tree can cause changes at every level of the tree, all the way up to the root, and all the way down into the children of the modified node. This leads to more time being spent performing reflow.

Thus, rendering elements of a rich (dynamic) web UI by injecting them into parts of a DOM tree may cause delay as the browser recalculates their view of the DOM elements (nodes). This delay may be caused at initial load time, upon updating the web UI (e.g., a refresh operation) and/or upon a page flip at the rich web UI, and may negatively affect the application responsiveness.

The disclosed subject matter provides a system and method for reducing website load time of a rich web UI of a web application (e.g., page flip times and/or the initial load time). The load latency, either at initial load or page flip of a rich web UI, may be reduced by hiding the base node (e.g., the main container or frame of the rich web UI) until the application determines that enough elements of the DOM tree have been added. The elements are added to the DOM tree of the main document. Once the application determines that the DOM tree is at a useful stage, the top node is made visible to the browser, such that the browser draws the elements in their final structure, thus reducing reflow. The useful stage refers to a stage of the rich web UI where enough elements are present that the rich web UI (or the portion associated with the hidden portion of the DOM tree) is desirable or useful to the user. For example, in the example of a calendar application, the useful stage may occur where event icon elements are added to the DOM tree. That is, because the purpose of the calendar rich web UI is to display the events associated with a user, the first instance at which the calendar becomes useful for the user is when such events are viewable by the user (i.e., the event elements are injected into the DOM) such that they can be drawn by the browser.

Upon receiving a request to load or update a rich web UI document, the application constructs a base DOM node. The base DOM node may for example refer to the general frame for the document (e.g., the grid within the calendar application). The base DOM node is made invisible to the browser such that the DOM node is hidden and not rendered by the browser. In one example, the application may hide the DOM node via inline style (display: none) or via a CSS class name defined referencing a display: none property. Alternatively, the base DOM node may be hidden and thus not renderable by various other techniques such as locating the base DOM node off screen, giving the base DOM node a 0 size and setting its overflow to hidden or using visibility: hidden as the base DOM node style. Upon constructing and hiding the base node, the application begins to create various elements (e.g., as additional or updated DOM nodes) which manipulate the DOM tree below the hidden base DOM node. These elements may for example refer to additional objects within the page, such as windows, icons, text, or other similar objects or resources. While the DOM tree is being updated, the browser may detect the updates to the DOM tree, however, because the base DOM node is invisible, the browser does not begin rendering the web UI based on the DOM tree.

Once the application determines that the DOM tree is at a useful stage (i.e., where the rich web UI, if rendered, would provide utility to the user), the application then changes the property of the hidden base DOM node to enforce a visible display node (e.g., via block or inline style change). Upon the base DOM node being made visible (i.e., exposed), the browser references the DOM tree and renders the rich web UI according to the DOM tree beginning at the base DOM node, including all DOM nodes that were added to the tree while the base DOM node was hidden. In one example, if the document is being loaded, during the time that the base DOM node is hidden, the browser may display a loading message. The same process may be performed with respect to any update to the web UI including client originated layout updates, such as navigating from one page into another within a rich web application. In such instance, the new page may be rendered with the base DOM node of the new page (or the updated page) being hidden. Once the new page DOM tree has been rendered (up to the useful stage), the base DOM node from the existing page may be hidden and the new base DOM node is made visible, such that the browser begins rendering the new page for display to the user.

FIG. 1 illustrates an example client-server network environment which provides for rendering a web document using a DOM tree structure. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in reducing load time for displaying a rich web UI or web application at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a rich web UI or web application. In the example of FIG. 1, electronic device 102 is depicted as a smartphone, electronic device 104 is depicted as a desktop computer, and electronic device 106 is depicted as a PDA. In one example, the electronic devices 102, 104 and 106 may have a web browser installed therein for accessing and viewing one or more rich web UIs and/or web applications. The browser may launch a web application (a rich internet application), for example upon receiving a request from the user, and the application may begin constructing a DOM tree for a rich web UI. Upon receiving the request from the user at a client device (e.g., electronic devices 102, 104 and 106), the browser may issue a request to the web server to receive the base page and/or one or more resources for generating or updating a DOM tree for displaying the rich web UI to the user. The request may include an initial load request or a refresh or page navigation request from the user.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser and/or the web application at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Upon receiving the base page (e.g., an HTML page received via the HTTP protocol) and parsing the base page the application begins constructing the DOM tree for the rich web UI. The application or browser may then send individual requests for additional resources based on parsing the base page and may update or modify the DOM tree.

Figure 2:
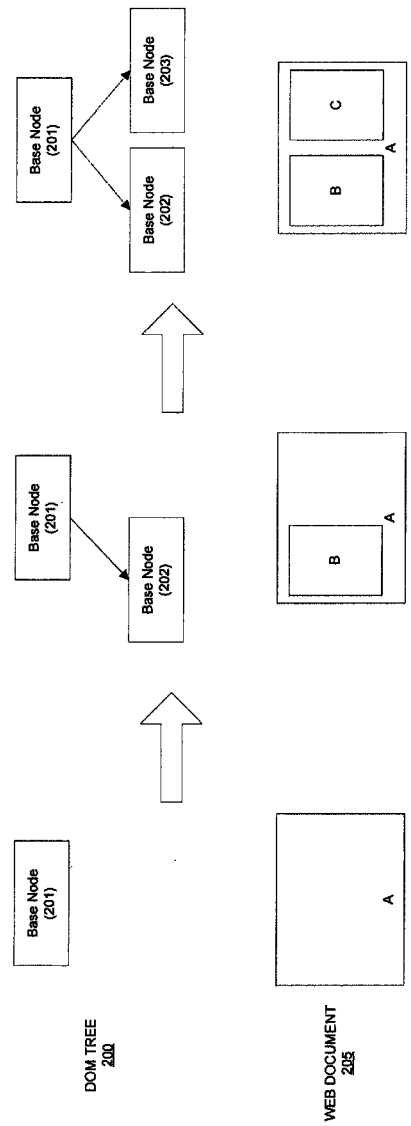
FIG. 2 illustrates an example DOM tree and screen shots of the displayed web document (e.g., a rich web UI) during the process of rendering and displaying a rich web document according to a first method including incremental rendering of the web document.

FIG. 2 illustrates an example DOM tree 200 and screen shots of the displayed web document 205 (e.g., a rich web UI) during the process of rendering and displaying a rich web document according to a first method including incremental rendering of the web document. As illustrated, the rich web UI is generated by first receiving a base page of the rich web UI (e.g., an HTML page) and parsing the page. In response to parsing the base page, the application renders a base node 201 within the DOM tree 200 representing a frame A of the rich web UI. During this stage, the browser references the DOM tree and begins the display rendering process by displaying the frame A. Next, the DOM tree is updated to include an additional node 202 representing an element B placed within the frame A. As the DOM tree is updated, the browser detects the updated DOM node and re-renders all or part of the document 205 to include element B within frame A. Next, the DOM tree is again updated to include a third node 203 representing a second element C, and the browser detects and may re-render at least a portion of the rich web UI to include the additional element C within frame A. Each of the elements B and C may include an image, text, window, button, widget or other similar element. The browser may continue incremental rendering of the web document according to the updated DOM tree until the entire DOM tree is completely rendered and thus the web document includes all of the elements associated with the rich web UI.

The injection of an additional element (e.g., element C) within the displayed rich web UI may require re-calculating the positions and geometries of other elements (e.g., frame A and element B) in the document 205, for the purpose of re-rendering all or part of the web document. This leads to more time being spent performing reflow.

Figure 3:
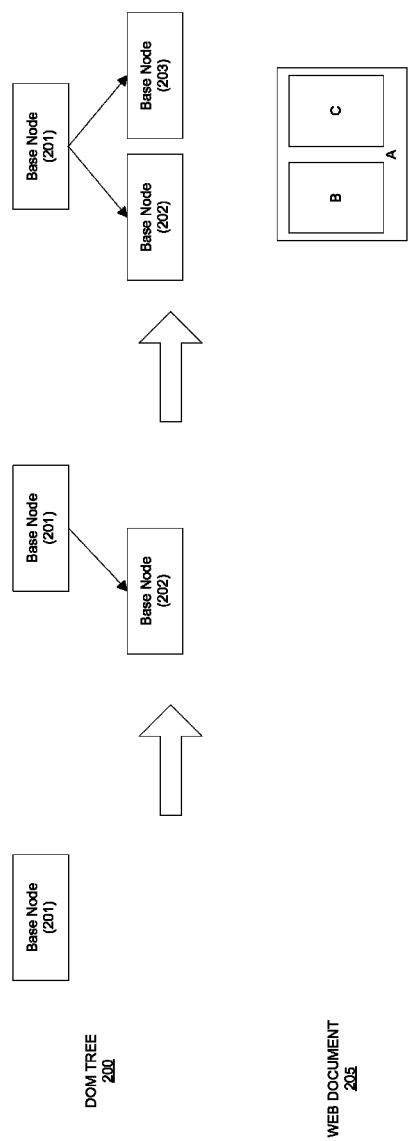
FIG. 3 illustrates an example DOM tree and screen shots of the displayed web document (e.g., rich web UI) during the process of rendering and displaying a web document according to the hidden layer rendering process.

FIG. 3 illustrates an example DOM tree 200 and screen shots of the displayed web document 205 (e.g., rich web UI) during the process of rendering and displaying a web document according to the hidden layer rendering process. As displayed the DOM tree construction is similar to that of FIG. 2. In contrast to FIG. 2, once the base DOM node 201 is generated, the base DOM node is made invisible (e.g., by assigning a display: none property to the base DOM node 201. Next, the DOM tree construction continues similar to the process of FIG. 2, adding one or more child nodes below the base DOM node. After detecting that the DOM tree beginning at the base DOM node is at a useful stage, the application then changes the style or property of the base DOM node to visible, such that the base DOM node 201 and the child nodes 202 and 203 are made visible to the browser. The browser then renders and displays the rich web UI according the DOM tree including frame A and elements B and C displayed within frame A.

While DOM tree 200 is described above as a single DOM tree representing the entire rich web UI and starting with the base page for the document, it should be understood that the base DOM node may refer to any node having one or more child nodes within the DOM tree for a rich web UI (e.g., parent rich web UIs) and need not be the root node within the DOM tree. Thus, all of part of a rich web user interface may be rendered in hidden layers (i.e. one or more layers beginning with a base DOM node and ending upon detecting that the DOM tree originated from that base DOM node is at a useful stage). Since the browser begins rendering the DOM tree elements for display in layers, the reflow time is reduced, thus optimizing the time for displaying a rich web UI to the user.

Figure 4:
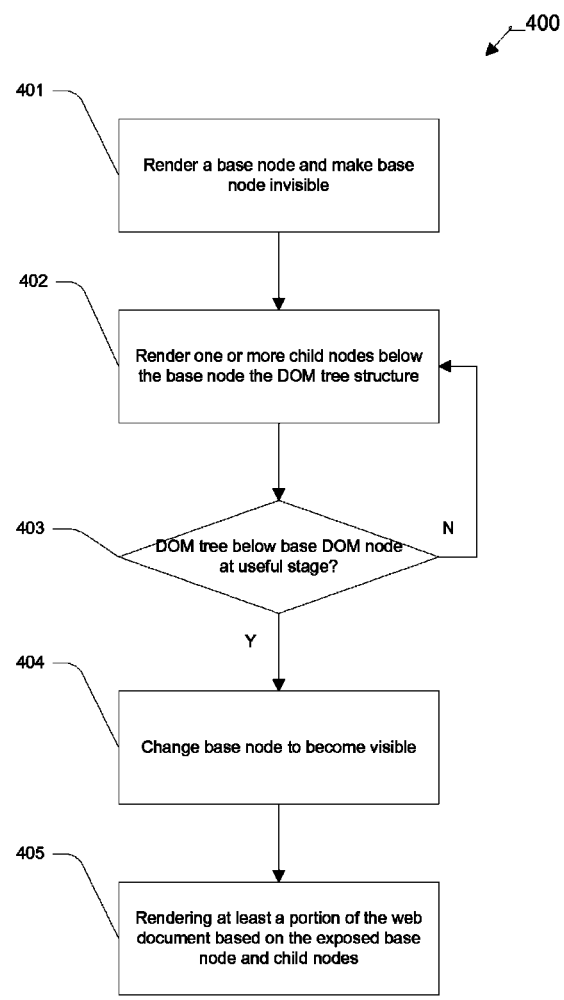
FIG. 4 illustrates a flow diagram of an example process 400 for displaying a rich web User Interface to a user.

FIG. 4 illustrates a flow diagram of an example process 400 for displaying a rich web User Interface to a user. In step 401, the process begins when the application constructs a base DOM node (e.g., a base node of the DOM tree), and makes the base DOM node invisible. For example, the base DOM node may be made invisible via inline style display: none or via a CSS class name that has been defined referencing a display: none property. The base DOM node may be constructed in response to various events, including for example initial loading of a web application or rich web UI (e.g., upon receiving a URL request from a user), updating a rich web UI or application (e.g., a refresh request), or navigating from a first page to a second page (i.e. a page flip). Thus, the process 400 may be initiated in response to a client or browser originated initial load up or layout update to a rich web UI and/or web application.

Next, the process continues to step 402 and constructs the next DOM node below the base DOM node (i.e., a child node) representing a second element of the rich web UI, which manipulate the DOM tree below the base DOM node. The application continues to create various components which manipulate the DOM tree below the base DOM node, until in step 403 it is determined that the DOM tree below the base DOM node has reached a useful stage (i.e., the base DOM node and the one or more other DOM nodes below the base DOM node represent a useful portion of the web document). The application may know the respective components or portion of the document represented by the base DOM node has one or more other components. Thus, the application assigns an invisible style to the base DOM node until the components associated with the base DOM node have been rendered within the DOM tree. In this instance the application determines that the base DOM node and its associated components have been rendered and according determines that the DOM tree is at a useful stage. The determination may be based upon a predefined point that trigger the determination that the DOM tree structure below the base DOM node is at a useful stage. Additionally, the determination that the DOM tree below the base DOM node is at a useful stage may be made according to various other criteria including but not limited to historical information regarding user interaction with the rich web UI or application or similar rich web UIs or web applications, the web application or rich web UI properties (e.g., the purpose of the web UI or web application), system or user settings or preferences, and other similar criteria that can be used to determine whether the elements represented within the DOM tree would result in displaying a rich web UI that is useful to the user.

Once in step 403 it is determined that the DOM tree below the base DOM node has components representing a useful stage of the rich web UI, the process continues to step 404. In step 404, the application changes the style or property of the base DOM node to enforce a visible or display mode (e.g., making the base DOM node visible to the browser using block or inline display setting). The base DOM node and all nodes below the DOM node are exposed to the browser as at least a portion of the DOM tree for the web document.

In step 405, the exposed DOM tree structure including the base DOM node and the one or more child DOM nodes below the base DOM node are referenced by the browser and the browser begins rendering all or a portion of a rich web UI for display to a user. In one example, the browser begins with the base DOM node and moves down to all rendered nodes of the DOM tree below the base DOM node.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
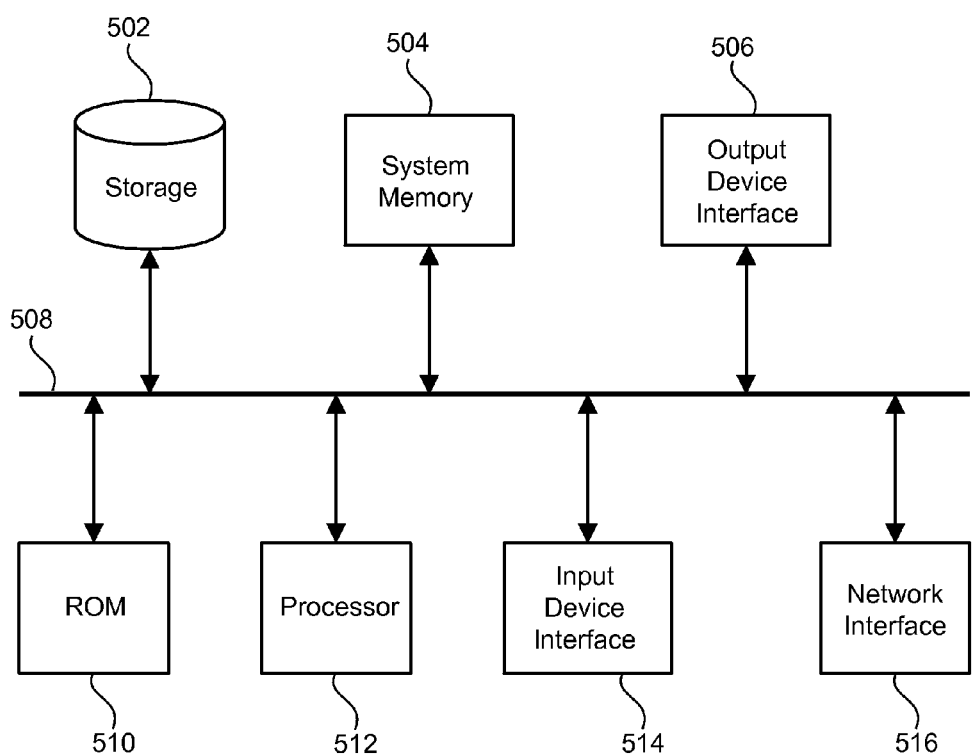
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for rendering DOM tree components according to various embodiments. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for optimizing the displaying of a rich web user interface (UI) to a user, the method comprising:
    rendering a hidden base node within a Dynamic Object Model (DOM) tree structure, wherein the DOM tree structure corresponds to at least a portion of a rich web UI;
    rendering one or more child nodes below the base node within the DOM tree structure;
    determining if one or more nodes of the one or more child nodes and the base node represent a useful portion of the rich web UI, wherein one or more nodes of the one or more child nodes and the base node are determined to represent a useful portion of the rich web UI when the one or more nodes of the one or more child nodes and the base node meet a pre-defined set of criteria; and
    exposing the base node if the one or more nodes of the one or more child nodes and the base node represent a useful portion of the rich web UI,
    wherein exposing the base node causes rendering the useful portion of the rich web UI by displaying display elements corresponding to each of the base node and the one or more child nodes; and
    wherein the useful portion of the rich web UI is less than all of the at least a portion of the rich web UI represented by the DOM tree structure.

2. The method of claim 1, wherein exposing the base node comprises enforcing a visible display mode, such that the browser begins rendering the portion of the rich web UI represented by the base node and the at least one child node for display to a user.

3. The method of claim 1, wherein the process of rendering the hidden base node comprises:
    rendering the base node within the DOM tree structure; and
    assigning a style property to the base node that causes the base node to remain invisible to the browser.

4. The method of claim 3, wherein assigning the style property to the base node causes the at least one child node to also be hidden from the browser.

5. The method of claim 1, further comprising:
    rendering an additional child node below the base node when it is determined that the one or more nodes of the one or more child nodes and the base node do not represent a useful portion of the rich web UI.

6. The method of claim 5, further comprising:
    determining if one or more nodes of the second child node and the one or more child nodes and the base node represent a useful portion of the rich web UI; and
    changing the hidden property of the base node to expose the base node if the one or more nodes of the second child node and the one or more child nodes and the base node represent a useful portion of the rich web UI.

7. The method of claim 1, wherein the rendering the base node and the one or more child nodes is performed in response to parsing a HTML page corresponding to the at least a portion of the rich web UI.

8. The method of claim 1, wherein the rendering the base node is in response to one of a initial loading of a rich web application or navigating from a first page to a second page of the rich web application.

9. The method of claim 1, wherein the rendering the base node is in response to a client-originated layout update of at least a portion of the rich web UI.

10. The method of claim 1, wherein the determination that the one or more nodes of the one or more child nodes and the base node represent a useful portion of the rich web UI is performed according to one or more of historical information regarding the rich web UI, historical information regarding similar rich web UIs or web applications, the web application or rich web UI properties system settings or preferences, or user settings or preferences.

11. The method of claim 1, wherein exposing the base node comprises changing a hidden property of the base node such that the base node is exposed to the browser.

12. A system for optimizing the displaying of a rich web UI to a user, the system comprising:
    one or more processors; and
    a computer-readable medium comprising instructions stored therein, which when executed by the processors, cause the processors to perform operations comprising:
        rendering a base node within a Dynamic Object Model (DOM) tree structure corresponding to at least a portion of a rich web UI;

assigning a style property to the base node such that the base node is invisible, and wherein the base node and any child nodes of the base node are not visually rendered for display while the base node is invisible;

rendering one or more child nodes below the base node within the DOM tree structure;

determining if the one or more child nodes and the base node represent a useful portion of the rich web UI, wherein the one or more child nodes and the base node are determined to represent a useful portion of the rich web UI, when the one or more child nodes correspond to a pre-defined level of the DOM tree structure; and exposing the base node to cause rendering of the useful portion of the rich web UI by displaying display elements corresponding to each of the base node and the one or more child nodes if the one or more child nodes and the base node represent a useful portion of the rich web UI, wherein the useful portion of the rich web UI is less than all of the at least a portion of the rich web UI represented by the DOM tree structure.

13. The system of claim 12, wherein the one or more child nodes comprise one or more of a child node of the base node and a child node of a child node of the base node.

14. The system of claim 12, the method of claim 1, wherein exposing the base node comprises setting the style property of the base node such that the base node is exposed to the browser.

15. The system of claim 12, wherein the base node and the one or more child nodes represent display elements of the at least portion of the rich web UI.

16. A computer-readable medium comprising instructions stored therein, which when executed by a machine, cause the machine to perform operations comprising:

rendering a base node within a Dynamic Object Model (DOM) tree structure corresponding to at least a portion of a rich web UI;

assigning a hidden property to the base node;

rendering one or more child nodes below the base node within the DOM tree structure;

determining if one or more nodes of the one or more child nodes and the base node represent a useful portion of the rich web UI, wherein the determining step is performed by determining whether the one or more nodes would result in displaying a portion of the web UI that is useful to the user, wherein whether a portion is useful is defined based on one or more of historical information regarding the rich web UI, historical information regarding similar rich web UIs or web applications, the web application or rich web UI properties system settings or preferences, or user settings or preferences; and exposing the base node if the one or more nodes represent a useful portion of the rich web UI, wherein exposing the base node causes rendering the useful portion of the rich web UI by displaying display elements corresponding to each of the base node and the one or more child nodes, wherein the useful portion of the rich web UI is less than all of the at least a portion of the rich web UI represented by the DOM tree structure.

* * * * *